Dec. 23, 1958  D. L. ANDERSON  2,865,689
SHAFT BEARING
Filed May 18, 1956  2 Sheets-Sheet 1

Inventor
Donald L. Anderson
McCanna and Morsbach
Attys

Dec. 23, 1958  D. L. ANDERSON  2,865,689
SHAFT BEARING
Filed May 18, 1956  2 Sheets-Sheet 2
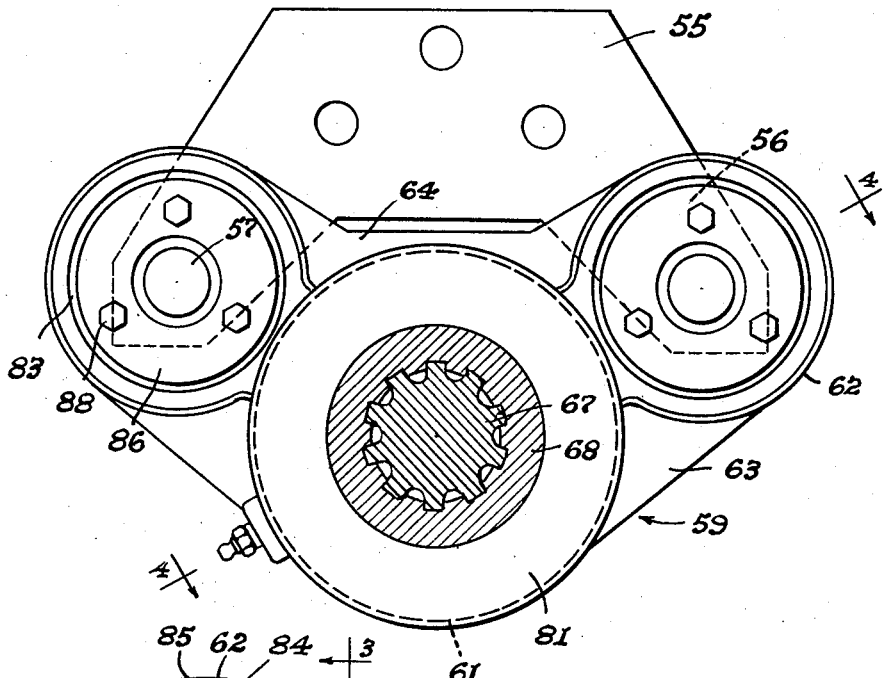
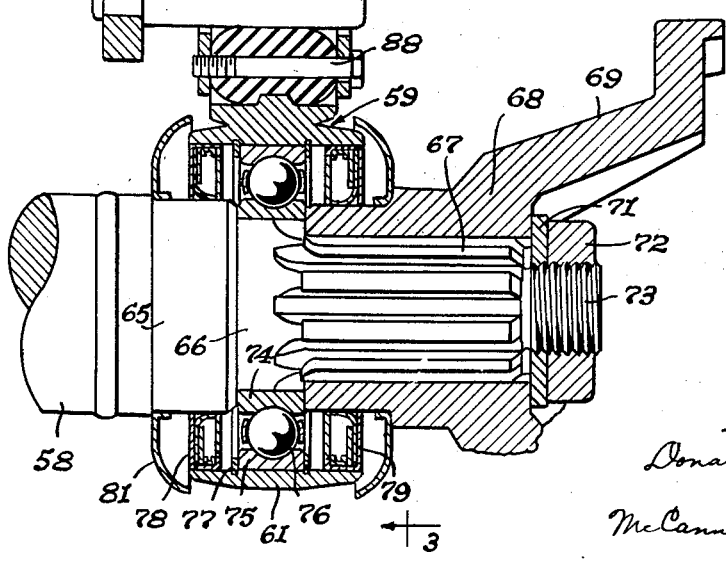
Inventor
Donald L. Anderson
McCanna and Morsbach
Att'ys United States Patent Office 2,865,689
Patented Dec. 23, 1958

2,865,689

SHAFT BEARING

Donald L. Anderson, Rockford, Ill., assignor of one-half to Edmund B. Anderson and one-half to Walter H. Stark, Rockford, Ill.

Application May 18, 1956, Serial No. 585,688

2 Claims. (Cl. 308—184)

This invention relates to shaft supports and more particularly pertains to an improved resilient mounting for rotary shafts.

An important object of this invention is to provide a resilient shaft mounting particularly adapted for use in automotive vehicles to support the drive shaft therefor and prevent transmission of vibrations from the drive shaft to the frame of the vehicle.

Another object of this invention is to provide a resilient mounting for a shaft bearing in which the bearing is supported so as to be self-aligning with the shaft.

A further object of this invention is to provide a resilient shaft mounting in which the resiliency of the radial support for the shaft can be readily and accurately adjusted to provide any desired amount of radial support for the shaft.

Yet another object of this invention is to provide a bearing mounting attachment which is adapted for use on conventional automotive vehicles to support the drive shaft therefor without necessitating any modification in the construction of the vehicle or drive shaft and which is adapted for use as a replacement for conventional rigid shaft supports customarily provided on such vehicles.

Still another object of this invention is to provide a resilient shaft support which is of simple and economical construction and which is rugged and durable in use.

These, together with various ancillary objects and advantages of this invention will be more readily appreciated as the same becomes better understood by reference to the following detailed description when taken in connection with the accompanying drawings wherein:

Fig. 3 is a transverse sectional view through the vehicle drive shaft, taken on the plane 3—3 of Fig. 4, and illustrating a modified form of shaft mounting; and Fig. 4 is a transverse sectional view through the shaft mounting of Fig. 3, and taken on the plane 4—4 of Fig. 3.

Figures 1, 2:
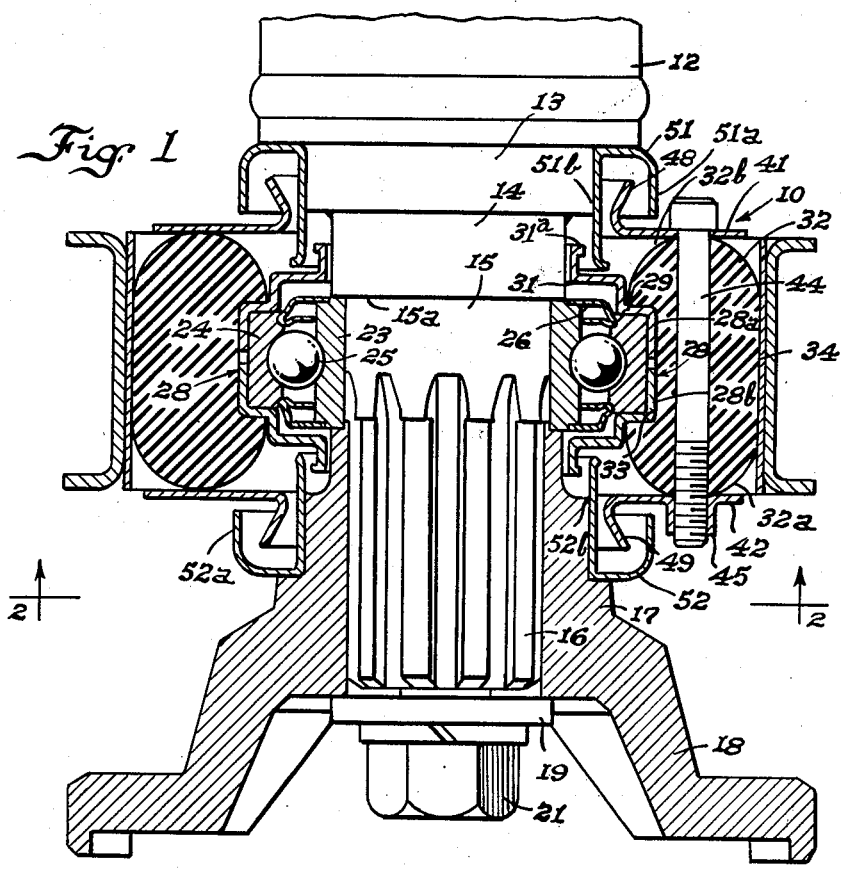
Figure 1 is a longitudinal sectional view through the resilient shaft mounting, taken on the plane 1—1 of Fig. 2.
Fig. 2 is a transverse sectional view through the drive shaft taken on the plane 2—2 of Fig. 1.

Reference is now made more specifically to the embodiment shown in Figs. 1 and 2 wherein the resilient shaft mounting, designated generally by the numeral 10 is shown mounted on the frame 11 of the vehicle to support the drive shaft 12 thereof. The drive shaft, as best illustrated in Fig. 1, is formed with a stepped end having an outer annular portion 13, an intermediate annular portion 14 and an inner annular portion 15. The end 16 of the shaft is externally splined to receive the internally splined hub 17 of the yoke 18 forming part of a universal joint of conventional construction. A washer 19 overlies the end of the drive shaft 16 and hub 17 and a stud 21 is threaded into the end of the drive shaft to retain the universal joint yoke 18 thereon.

An anti-friction bearing is mounted on the shaft and includes an inner race 23 disposed on the inner annular portion 15. The inner race abuts at one side thereof against the shoulder 15a between the inner and intermediate annular portions 15 and 14 respectively, and against the inner end of the hub 17 at the other side thereof to be retained thereby against axial movement on the drive shaft. An outer bearing race 24 is rotatably supported by balls 25 on the inner bearing race and suitable seals 26, of conventional construction are provided to seal the anti-friction bearing against the entrance of foreign material.

A stepped collar 28 is disposed around the outer bearing race 24 and is formed in identical half sections 28a and 28b to permit assembly on the outer bearing race. Each of the sections of the collar have inwardly extending flanges 29 extending radially inwardly along opposite sides of the outer bearing race 24 and generally Z-shaped portions 31 on the inner edges of said flanges, which Z-shaped portions terminate in an outwardly extending lip 31a to define an outwardly facing annular channel. A toroidally shaped insert 32 is disposed around the collar 31 and formed with a channel 33 in the radially inner face thereof for the reception of the collar 28 to limit axial movement of the insert relative thereto. The insert, in accordance with the present invention, is formed of a resilient and deformable material such as rubber and is disposed within an annular ring 34 which completely surrounds the same. The bearing and the mounting therefor are supported by a U-shaped hanger 36 which extends partially around the ring 34 and which is adapted for attachment as by fasteners 37 to the frame 11 of the vehicle.

The insert is formed with a generally elliptical cross section to provide opposed convex sides 32a and 32b. A pair of annular plates 41 and 42 are disposed adjacent the opposed convex sides of the insert 32 and dimensioned so as to be spaced radially from the ring 34 and from the drive shaft 12 to prevent metal-to-metal contact therebetween. Provision is made for axially compressing the insert 32 to radially expand the same and for this purpose a plurality of annularly spaced studs 44 are provided and extend through one of the plates such as 41 and through the insert 32 and threaded into a boss 45 on the other plate 42. By tightening the studs 44, the insert is axially compressed to effect radial expansion of the latter. Since the opposed sides 32a and 32b of the insert 32 are convex in cross section, it is apparent that tightening of the studs 44 will progressively increase the radial support provided for the bearing and shaft. This is advantageous since the amount of vibration of the shaft varies with the unbalance in the shaft and the speed of rotation thereof, and the support can therefore be readily adjusted to provide a greater or lesser amount of radial support depending upon the magnitude of the vibrations in the shaft.

The shaft mounting is advantageously constructed to inhibit the entrance of foreign material into the anti-friction bearing, and as best shown in Fig. 1, the radially inner edges of the plates 41 and 42 are turned outwardly to provide outwardly facing channels 48 and 49, respectively, adapted to collect water and other foreign material and convey the latter to the low point on the channel. Slingers 51 and 52 are mounted on the outer annular portion 13 of the drive shaft and on the hub 17 of the universal yoke, respectively, which slingers are in the form of opposed U-shaped channels having outer legs 51a and 52a adapted to overlie the channels 48 and 49 on the plates 41 and 42 and inner legs 51b and 52b arranged to extend axially inwardly and overlie the channels formed at the inner edges of the collar 28.

A modified form of bearing mounting is illustrated in Figs. 3 and 4 and is arranged for use in heavy duty applications such as trucks and the like employing relatively large drive shafts. More particularly, the shaft mounting comprises a mounting bracket 55 having spaced legs 56 and pins 57 rigidly affixed to the legs and extending perpendicular thereto. The vehicle drive shaft 58 is supported on the pins 57 by means of a rigid frame generally indicated by the numeral 59 and including a central ring 61 and spaced side rings 62. The frame 59 may conveniently be cast in one piece and suitable fillets 63 and 64 provided between the central ring 61 and the side rings 62 to rigidly join the latter together. As in the preceding embodiment, the drive shaft 58 is formed with a stepped end including an outer annular portion 65 and an inner annular portion 66. The end 67 of the drive shaft is externally splined to receive the internally splined hub 68 of the universal yoke 69. The hub is retained on the drive shaft by means of a washer 71 and nut 72 which is threaded on the externally threaded end 73 of the drive shaft. An anti-frictiion bearing including an inner race 74, an outer race 75 and anti-friction bearing members 76 is disposed in the inner annular portion 66 of the drive shaft. The drive shaft and anti-friction bearing are disposed within the central ring 61 and locked against movement thereat by suitable split rings 77. Seals 78 and 79 of any conventional construction are respectively mounted between the central ring 61 and the drive shaft and between the central ring and the hub 68 to prevent foreign material from entering the bearing. Slingers 81 are mounted on the drive shaft and hub 68 and extend outwardly beyond the outer periphery of the central ring, as is clearly shown in Fig. 4.

A toroidally shaped insert 83 formed of a resilient and deformable material is disposed within each of the side rings 62 and surrounds the respective pins 57 to support the bearing and shaft thereon. The side rings are preferably formed with an inwardly extending rib 84 on the inner face thereof and the resilient inserts 83 are formed with a complementary groove 85 to receive the rib and prevent axial displacement of the insert relative to the ring. As in the preceding embodiment, the resilient inserts 83 are formed with a generally elliptically shaped cross section to provide opposed convex sides 83a and 83b. Spaced annular plates 86 and 87 are disposed on opposite sides of the inserts and are dimensioned to be spaced radially from the respective side ring 62 and pin 57 to prevent metal-to-metal contact therebetween. A plurality of annularly spaced studs 88 are provided to draw the plates 86 and 87 together and as shown in Fig. 4 extend through one of the side plates 86 and through the insert 83 and are threaded into the other side plate 87 to draw the plates together as the studs are tightened. The resilient inserts 83 are thus axially compressed in response to tightening of the studs 88 and are radially expanded into snug engagement with the respective side ring 62 and pin 57. Since the opposed sides 83a and 83b of the insert are convex in cross section, it is apparent that the radial support between the side ring and the respective pin 57 is progressively increased as the studs 88 are tightened.

From the foregoing it is apparent that the shaft mounting is arranged to resiliently support a shaft and prevent the transmission of the shaft vibrations to the frame of the vehicle. Moreover, the mount will also permit limited angular shifting of the shaft bearing so that the latter is free to align itself with the shaft. Since the insert is formed with an elliptical cross section, drawing of the opposed annular plates towards each other and against the insert will progressively compress the latter to provide any desired degree of radial support for the shaft. Thus, if the shaft has an appreciable unbalance and transfers vibration into the chassis, the insert may be adjusted to a greater or lesser degree, to minimize the vibrations reaching the occupants in the vehicle.

Every rotating mass has its own frequency rate and this mounting can be adjusted to the correct rate for any mass within its limits.

I claim:

1. A shaft mounting comprising a shaft, anti-friction bearing means including means defining an inner bearing race on said shaft fixed against axial movement with respect thereto and an outer bearing race rotatable with respect thereto, a bearing support member attached to said outer race and fixed against axial movement with respect thereto, means on said support member defining an annular rib, a toroidally shaped insert formed of resilient and deformable material having an annular recess therein medially between the ends thereof for receiving said rib to hold said insert against axial movement with respect to said support member, a mounting bracket having a cylindrical wall slidably engaging said insert at the side thereof opposite said recess, said insert having convex faces at opposite ends thereof, a pair of annular plates engaging said convex faces at opposite ends of said insert, and fasteners extending through said insert and attached to said plates to support the latter in said insert and for drawing the plates toward each other to axially compress said insert and radially expand the same against said mounting bracket to hold said insert against axial movement with respect to the mounting bracket and to provide an adjustable resilient support for said bearing means.

2. A shaft mounting comprising a shaft, anti-friction bearing means including means defining an inner bearing race on said shaft fixed against axial movement with respect thereto and an outer bearing race rotatable with respect to said inner race, means defining an annular rib on said outer race, a toroidally shaped insert formed of resilient and deformable material having an inwardly facing annular recess therein medially between the ends thereof for receiving said rib to hold said insert against axial movement with respect to said inner race, a support bracket having a cylindrical inner surface open at the ends thereof for slidably receiving said insert, means attaching said support bracket to a support, said insert having convex faces at opposite ends thereof, a pair of annular plates engaging said convex faces at opposite ends of said insert, and fasteners extending through said insert and attached to said plates to support the latter on said insert and for drawing said plates toward each other to axially compress said insert and radially expand the same against said support bracket to hold said insert against axial movement with respect to the outer member and to provide an adjustable resilient support for said bearing means.

References Cited in the file of this patent

UNITED STATES PATENTS 2,674,330    Feil _____ Apr. 6, 1954

FOREIGN PATENTS 712,677    France _____ Oct. 7, 1931
1,102,771    France _____ May 11, 1955